United States Patent [19]
Matsumoto

[11] Patent Number: 5,936,543
[45] Date of Patent: Aug. 10, 1999

[54] SECRET INFORMATION IDENTIFICATION SYSTEM

[75] Inventor: Mariko Matsumoto, Tokyo, Japan

[73] Assignee: NEC Corporation, Tokyo, Japan

[21] Appl. No.: 08/861,612

[22] Filed: May 22, 1997

[30] Foreign Application Priority Data

May 22, 1996 [JP] Japan .................................. 8-126184

[51] Int. Cl.⁶ .................................................... G07D 7/00
[52] U.S. Cl. ............................. 340/825.34; 340/825.31; 327/156; 327/159; 380/25
[58] Field of Search ......................... 340/825.34, 825.31; 331/25, 18, 14; 371/27.7, 61; 375/354, 376; 377/39; 327/159, 156, 115; 380/25

[56] References Cited

U.S. PATENT DOCUMENTS

| | | | |
|---|---|---|---|
| 4,800,590 | 1/1989 | Vaughan | 380/25 |
| 5,657,361 | 8/1997 | Inagaki et al. | 377/39 |
| 5,663,687 | 9/1997 | Kozu | 331/14 |

*Primary Examiner*—Michael Horabik
*Assistant Examiner*—Jean B. Jeanglaude
*Attorney, Agent, or Firm*—Scully, Scott, Murphy & Presser

[57] ABSTRACT

In a secret information identification system, an input password is compared with a registered password every time a permission signal is generated. Lock release permission is given when a comparison result indicates coincidence. Alternatively, an input password is compared with a registered password and lock release permission is given every time a permission signal is generated when the comparison indicates coincidence. The cycle of generation of the permission signal is elongated as the number of events of non-coincidence in comparison results increases. As a result, the password is not easily broken, and further the password input function is not locked even after input of a wrong password.

33 Claims, 11 Drawing Sheets

SECRET INFORMATION IDENTIFICATION SYSTEM

BACKGROUND OF THE INVENTION

1. Field of the Invention

The present invention relates to personal information identification systems and, more specifically, to an identification system which verifies input secret information.

2. Description of the Related Art

In automatic teller machines and the like installed in banking organs, a user is authenticated by his inputting secret data such as a password, whereby use of his account, for instance, by other persons is prohibited. That is, in this type of system, an input password is compared with a preset password and a machine is allowed to start operating when the two passwords coincide with each other. In such a system, a preset password is generally a fixed one. There are known several types of the system including a first type system which allows a user to input passwords a limitless number of times and another type system in which a password input function is locked, i.e., disabled if passwords are input more than a given number of times (refer to Japanese Unexamined Patent Publication No. 62-219048).

The above-described conventional systems have the following disadvantages. In the first type system which allows a user to input passwords a limitless number of times, a password is likely broken by using a computer, for instance. In the other type system in which a password input function is locked to disable subsequent password inputs if passwords are input more than a given number of times, the password input function is locked when wrong passwords are input inadvertently, in which case even the true user is prohibited from using the machine.

SUMMARY OF THE INVENTION

The present invention has been made to solve the above problems in the art, and therefore an object of the present invention is to provide a system where a secret information is hard to break and an information input function is not locked.

According to the present invention, a system for providing authorization by checking whether input information is coincident with predetermined information, includes a first controller which varies permission timing based on a check result of the input information and a second controller which provides the authorization when the check result indicates coincidence at the permission timing. The first controller may elongate an interval of the permission timing based on the check result of the input information. Preferably, the first controller may elongate the interval of the permission timing as the number of check results indicating non-coincidence increases. Further, the first controller may randomly vary an interval of the permission timing based on the check result of the input information.

According to an aspect of the present invention, the input information is compared with the predetermined information every time the permission signal is generated and, when a comparison result indicates coincidence, the authorization such as lock release is provided. The cycle or interval of generation of the permission signal is varied according to the number of events of non-coincidence in comparison results.

According to another aspect of the invention, the input information is compared with the predetermined information, and the authorization is given in response to generation of the permission signal when a comparison result indicates coincidence. The interval or cycle of generation of the permission signal is varied according to the number of events of non-coincidence in comparison results.

Therefore, even if all possible secret information are input, coincidence does not occur. This provides an advantage that the secret information is not easily broken even with the use of a computer or the like. Further, according to the invention, the secret information input function is not locked. This provides another advantage that even after input of incorrect information, the lock of a system can still be released by inputting the predetermined information.

BRIEF DESCRIPTION OF THE DRAWINGS

The above and other objects and advantages will become apparent from the following detailed description when read in conjunction with the accompanying drawings wherein.

DESCRIPTION OF THE PREFERRED EMBODIMENTS

Figure 1:
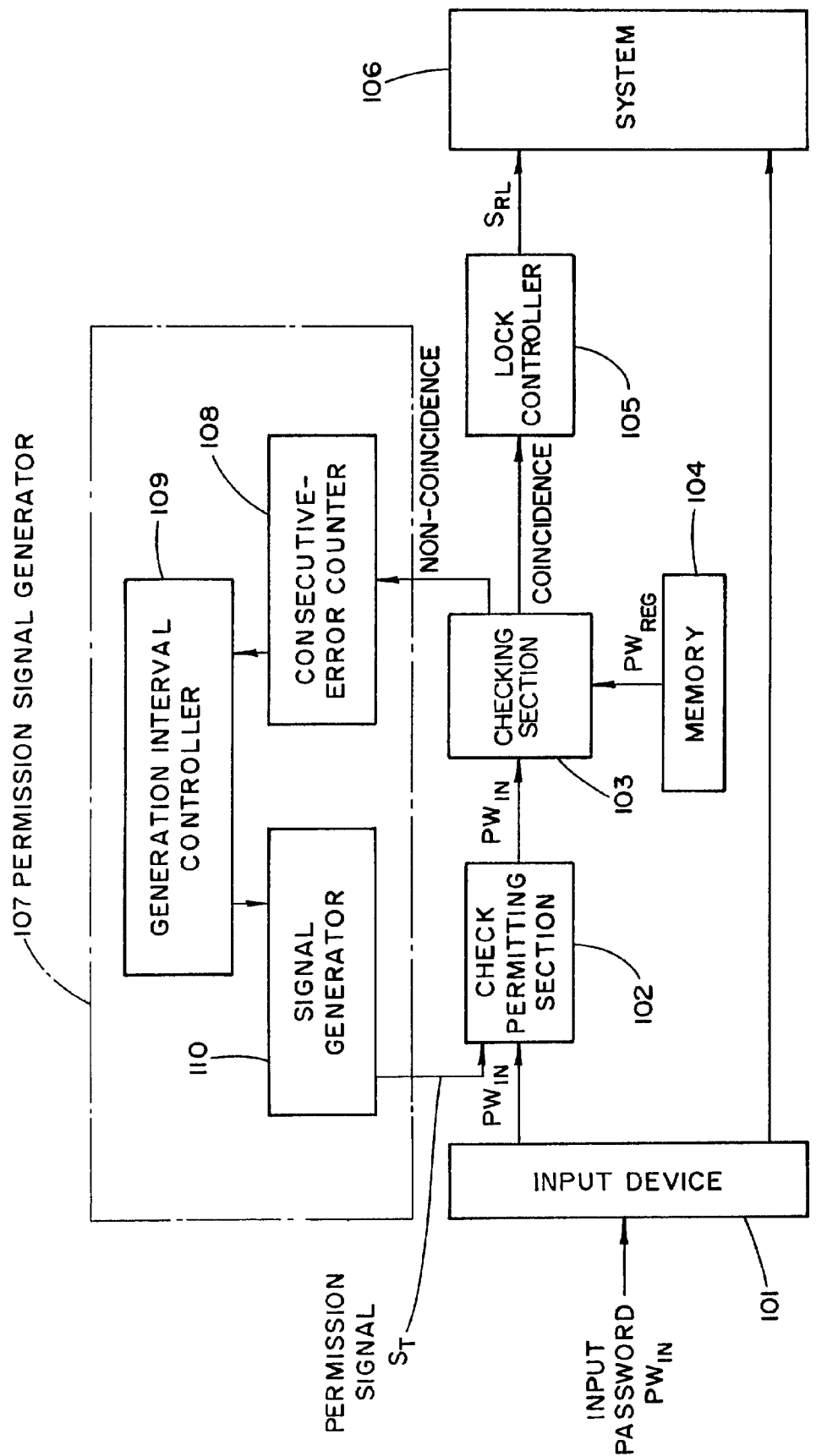
FIG. 1 is a block diagram showing the configuration of a password identification system according to an embodiment of the present invention.

Referring to FIG. 1, a password identification system according to an embodiment of the present invention has the following configuration. An input device 101 such as a keypad allows a user to input a password $PW_{IN}$ and other necessary information. A check permitting section 102 transfers the input password $PW_{IN}$ to a checking section 103 in response to a permission signal $S_T$. In other words, the check permitting section 102 has a function of permitting a checking operation in response to the permission signal $S_T$. The checking section 103 checks the input password $PW_{IN}$ by comparing it with a registered password $PW_{REG}$ previously stored in a memory 104. When the comparison result is "coincidence," a lock controller 105 releases the lock of a system 106. A permission signal generator 107 receives the comparison result from the checking section 103 and generates the permission signal $S_T$ with varying the cycle of generation of the permission signal $S_T$ based on the comparison result.

The permission signal generator 107 includes a consecutive-error counter 108 which counts the number of consecutive comparison results of "non-coincidence" received from the checking section 103. A generation interval controller 109 controls the generation interval (or cycle) of the permission signal $S_T$ in accordance with the count of the counter 108 as will be described later. A signal generator 110 generates the permission signal $S_T$ under the control of the controller 109 and supplies it to the check permitting section 102.

Figure 2:
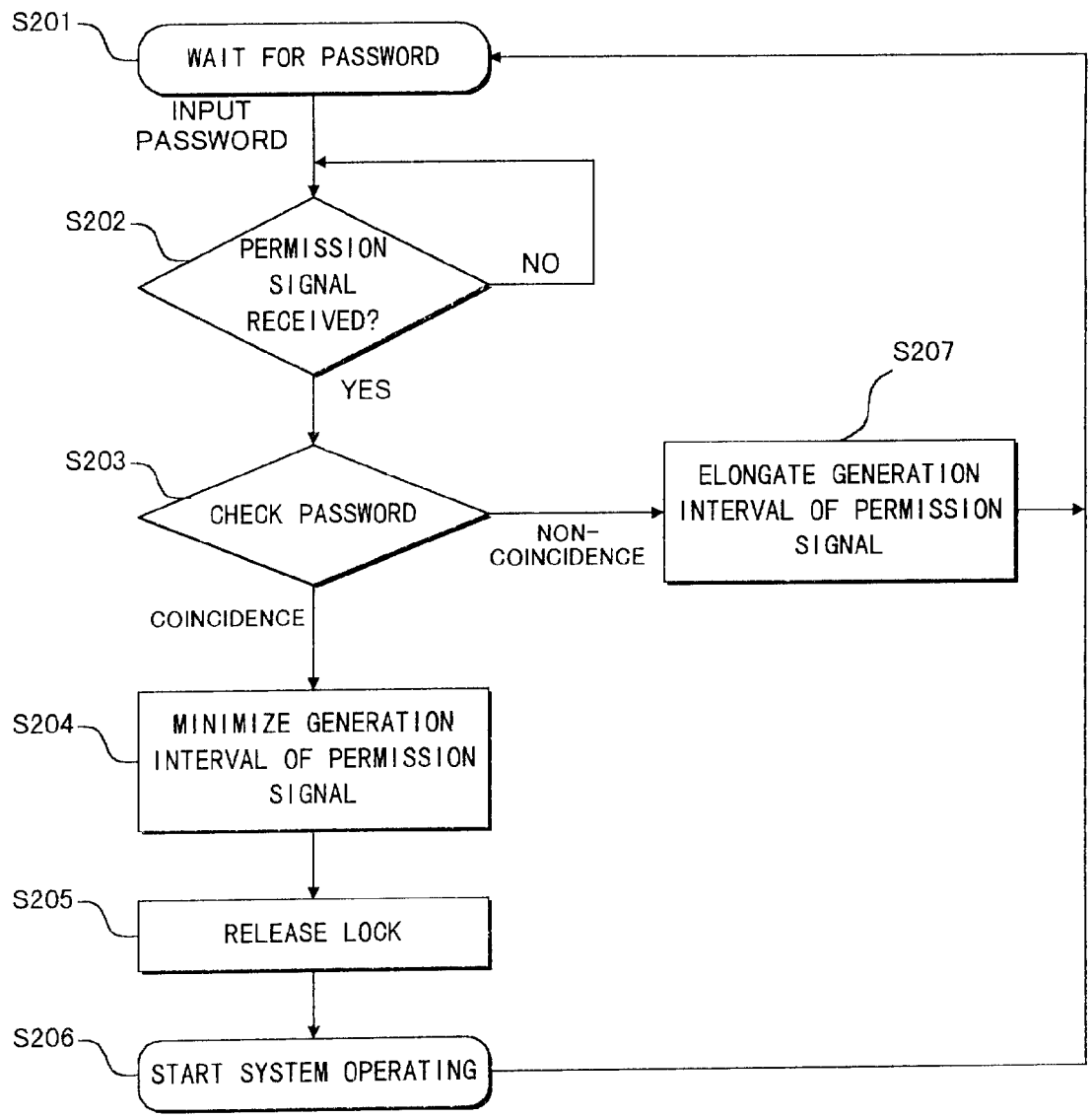
FIG. 2 is a flowchart showing an operation of the password identification system of FIG. 1.

Referring to FIGS. 1 and 2, the permission signal generator 107 generates permission signals $S_T$ as trigger signals for permitting the checking operation. Normally, the permission signal generator 107 generates permission signals $S_T$ at minimum intervals. When a password $PW_{IN}$ is input through the input device 101 (step S201), the check permitting section 102 waits for generation of a permission signal $S_T$ by the permission signal generator 107 (step S202). When a permission signal $S_T$ is detected (YES at step S202), the checking section 103 compares the input password $PW_{IN}$ with the registered password $PW_{REG}$ stored in advance in the memory 104 (step S203). If the comparison result is "coincidence," the generation interval of the permission signals $S_T$ is minimized (step S204) and then the lock controller 105 operates to release the lock of the system 106 (step S205), thereby allowing it to operate (step S206).

On the other hand, if the input password $PW_{IN}$ is different from the registered password $PW_{REG}$, the checking section 103 detects non-coincidence (step S203). The consecutive-error counter 108 of the permission signal generator 107 counts consecutive errors in input passwords, and the generation interval controller 109 sets a permission signal generation interval in accordance with the count of the counter 108 (step S207). In this embodiment, the permission signal generation interval (cycle) is elongated as the count increases. The signal generator 110 generates permission signals $S_T$ at the thus-set cycle or interval.

In this state where the permission signal generation interval (cycle) has been elongated, even if a password $PW_{IN2}$ is again input after a lapse of a short time, the check permitting section 102 does not permit the checking operation of the checking section 103 because no permission signal is generated due to the elongated permission signal generation interval. A user is not given any permission signal generation information. When he further inputs a password $PW_{IN3}$ and a permission signal $S_T$ is then generated after a lapse of the permission signal generation interval, the check permitting section 102 permits the checking operation in the checking section 103 (YES at step S202). In response, the checking section 103 compares the input password $PW_{IN3}$ with the registered password $PW_{REG}$ (step S203). The fact that the input password $PW_{IN2}$ is not subjected to checking is the important feature of this system. That is, even if the input password $PW_{IN2}$ is a registered one, the system 106 is not allowed to operate.

If non-coincidence is again detected with an input password $PW_{IN3}$, the count of consecutive errors is incremented by one. As a result, the generation interval controller 109 further elongates the permission signal generation interval (step S207), which means that the non-operational time of the checking section 103 is elongated accordingly. If coincidence is detected with the input password $PW_{IN3}$, the permission signal generation interval is set at the minimum value (step S204), the lock is released (step S205), and the system 106 is allowed to operate (step S206).

A consideration will be given to a case where a registered password is input once after N times of input of wrong passwords. In this case, permission signals $S_T$ are generated at permission signal generation intervals corresponding to the number N of consecutive errors. When a registered password $PW_{REG}$ is input and the check permitting section 102 receives a permission signal $S_T$ that is generated after a lapse of the permission signal generation interval that corresponds to the number N of consecutive errors, the check permitting section 102 outputs the input password $PW_{IN}$ to the checking section 103 to permit the checking operation. When the checking section 103 compares the input password $PW_{IN}$ with the registered password $PW_{REG}$ and detects coincidence, the permission signal generation interval is returned to the minimum value (step S204), the lock is released (step S205), and the system 106 is allowed to operate (step S206).

Figure 3:
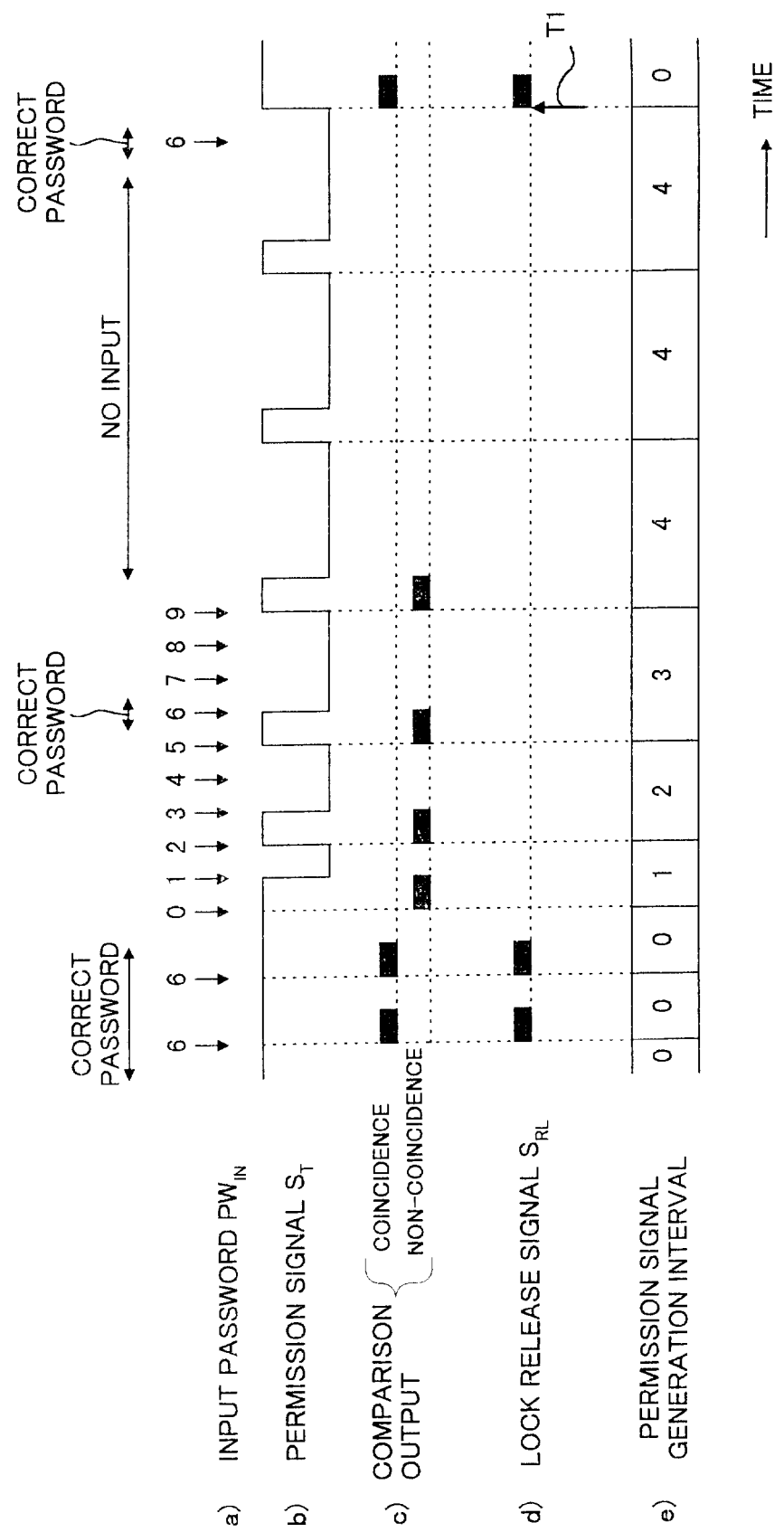
FIG. 3 is a time chart showing an example of the operation of the password identification system of FIG. 1.
Figure 4:
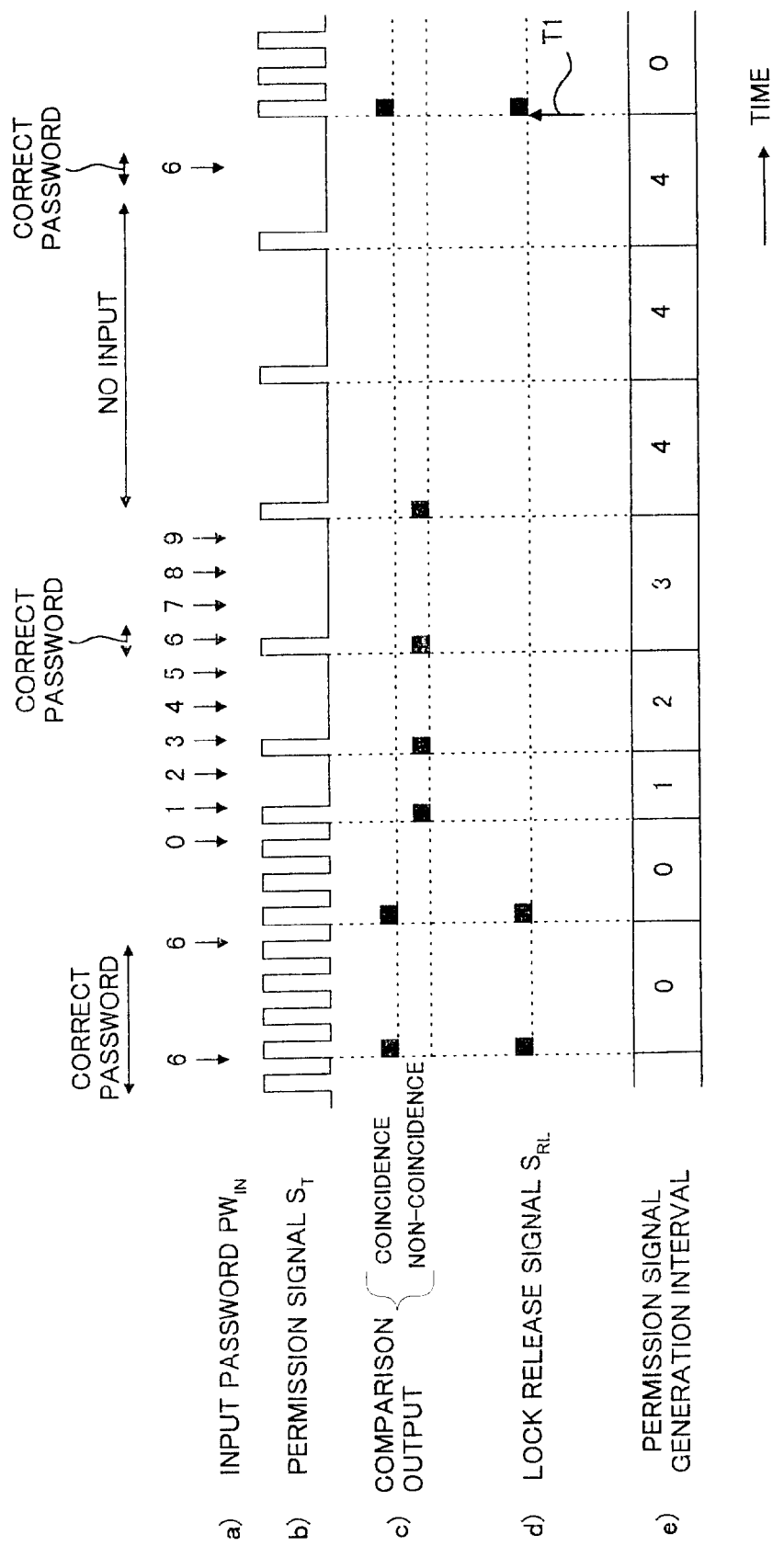
FIG. 4 is a time chart showing another example of the operation of the password information identification system of FIG. 1.

Next, the permission signal generation interval will be described with reference to time charts of FIGS. 3 and 4. Each of FIGS. 3 and 4 shows input passwords $PW_{IN}$, permission signal $S_T$, comparison outputs indicating a comparison result (coincidence or non-coincidence) of the checking section 103, and lock releasing signal $S_{RL}$ which is output from the lock controller 105. In each of FIGS. 3 and 4, the horizontal axis represents time while solid segments of the comparison outputs and the lock releasing signals $S_{RL}$ represent active states and the remaining portions represent inactive states.

In the permission signals $S_T$ of FIG. 3(b), permission is indicated by a high level. The permission signals $S_T$ of FIG. 4(b) are used as triggers and operations are effected at the rising edges of the triggers. While no password is input, the checking operation is not performed even if a permission signal $S_T$ is generated. In this example, to simplify the description, it is assumed that the registered password $PW_{REG}$ is "6" and input of only passwords $PW_{IN}$ ranging from "0" to "9" is accepted.

Referring to FIG. 3, in the normal state in which the permission signal generation interval is set to a minimum value ("0" in this example), the lock is released and the system 106 is allowed to operate as soon as the registered password $PW_{REG}$ of "6" is input.

A consideration will be given to a case where a user who intends to break the password inputs all passwords "0" to "9" on a try-everything basis. When a first password $PW_{IN1}$ of "0" is input, the checking section 103 detects non-coincidence and the number of consecutive errors becomes 1. As a result, the permission signal generation interval, which was "0" in the initial state, becomes "1." When a next password $PW_{IN2}$ of "1" is input, the checking operation is not performed because no permission signal $S_T$ is generated. Since the user is not given the permission signal generation information, he inputs a next password $PW_{IN3}$ of "2." Since a permission signal $S_T$ is generated thereafter, the input password is compared with the registered password $PW_{REG}$. As a result, non-coincidence is again detected, whereby the number of consecutive errors becomes 2 and the permission signal generation interval also becomes "2."

When next passwords $PW_{IN4}$ and $PW_{IN5}$ (i.e., "3" and "4") are sequentially input, the checking operation is not performed because no permission signals are generated. When a further next password $PW_{IN6}$ of "5" is input, a permission signal $S_T$ is generated thereafter and hence the input password $PW_{IN6}$ is subjected to the checking operation. Since non-coincidence is detected, the number of consecutive errors becomes 3 and the permission signal generation interval becomes "3."

Although a registered password $PW_{IN7}$ of "6" is input next, the checking section 103 does not performs its checking operation because no permission signal $S_T$ is generated. Subsequently, passwords $PW_{IN8}$ to $PW_{IN10}$ of "7" to "9" are sequentially input. Since a permission signal $S_T$ is generated after the input of the password $PW_{IN10}$ of "9," only that password is subjected to the checking operation. Since non-coincidence is again detected, the number of consecutive errors becomes 4 and the permission signal generation interval becomes "4." Thereafter, the checking section 103 does not operate while no password input is made. Therefore, neither coincidence nor non-coincidence is detected and the permission signal generation interval is kept at "4."

Even when a registered password $PW_{IN11}$ of "6" is thereafter input, the checking operation is not performed until generation of a permission signal $S_T$. The checking section 103 performs its checking operation when a permission signal $S_T$ is generated at time T1 after a lapse of a permission signal generation interval "4." Since password coincidence is detected at that time, the lock is released and the system 106 is allowed to operate.

Referring to FIG. 4, as in the case of the example of FIG. 3, in the normal state, the permission signal generation interval is set to the minimum value. In this example, the permission signal $S_T$ is generated as a trigger signal with rising consecutively. If a registered password $PW_{REG}$ of "6" is input in this state, the lock is released immediately and the system 106 is allowed to operate.

In the case where a user who intends to break the password inputs all passwords "0" to "9" on a try-everything basis, as in the case of the example of FIG. 3, the permission signal generation interval is elongated as the number of consecutive events of non-coincidence in comparison results increases. After the number of consecutive errors becomes 4 and the permission signal generation interval becomes "4", the checking section 103 does not operate while no password input is made. Therefore, neither coincidence nor non-coincidence is detected and the permission signal generation interval is kept at "4."

Even when a registered password $PW_{IN11}$ of "6" is thereafter input, the checking operation is not performed until generation of a permission signal $S_T$. The checking section 103 performs its checking operation when a permission signal $S_T$ is generated at time T1 after a lapse of a permission signal generation interval "4." Since password coincidence is detected at that time, the lock is released and the system 106 is allowed to operate.

Figure 5:
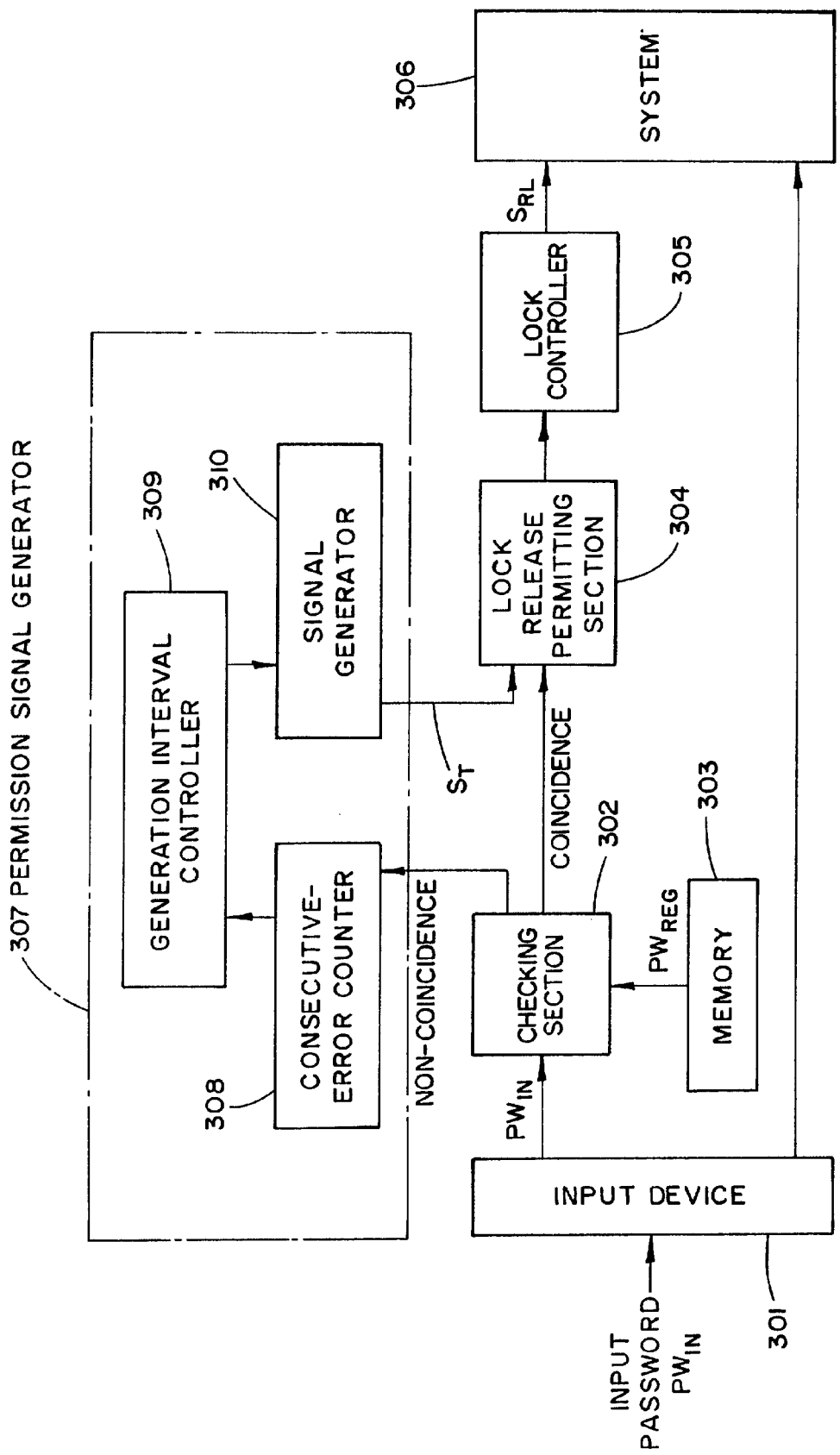
FIG. 5 is a block diagram showing the configuration of a password identification system according to another embodiment of the invention.

Referring to FIG. 5, a password identification system according to another embodiment of the invention has the following configuration. An input device 301 such as a keypad allows a user to input a password $PW_{IN}$ and other necessary information. The password $PW_{IN}$ is output to a checking section 302 which checks the input password $PW_{IN}$ by comparing it with a registered password $PW_{REG}$ previously stored in a memory 303. The comparison result of the checking section 302 is output to a lock release permitting section 304 and a permission signal generator 307. The lock release permitting section 304 outputs a lock release permission signal to a lock controller 305 in response to the comparison result of "coincidence" and a permission signal $S_T$. In other words, the lock release permitting section 304 has a function of permitting lock release in response to the comparison result and the permission signal $S_T$. When receiving the lock release permission signal from the lock release permitting section 304, the lock controller 305 releases the lock of a system 306. The permission signal generator 307 receives the comparison result from the checking section 302 and generates the permission signal $S_T$ with varying the cycle of generation of the permission signal $S_T$ based on the comparison result.

The permission signal generator 307 includes a consecutive-error counter 308 which counts the number of consecutive comparison results of "non-coincidence" received from the checking section 302. A generation interval controller 309 controls the generation interval (or cycle) of the permission signal $S_T$ in accordance with the count of the counter 308 as will be described later. A signal generator 310 generates the permission signal $S_T$ under the control of the controller 309 and supplies it to the lock release permitting section 304.

Figure 6:
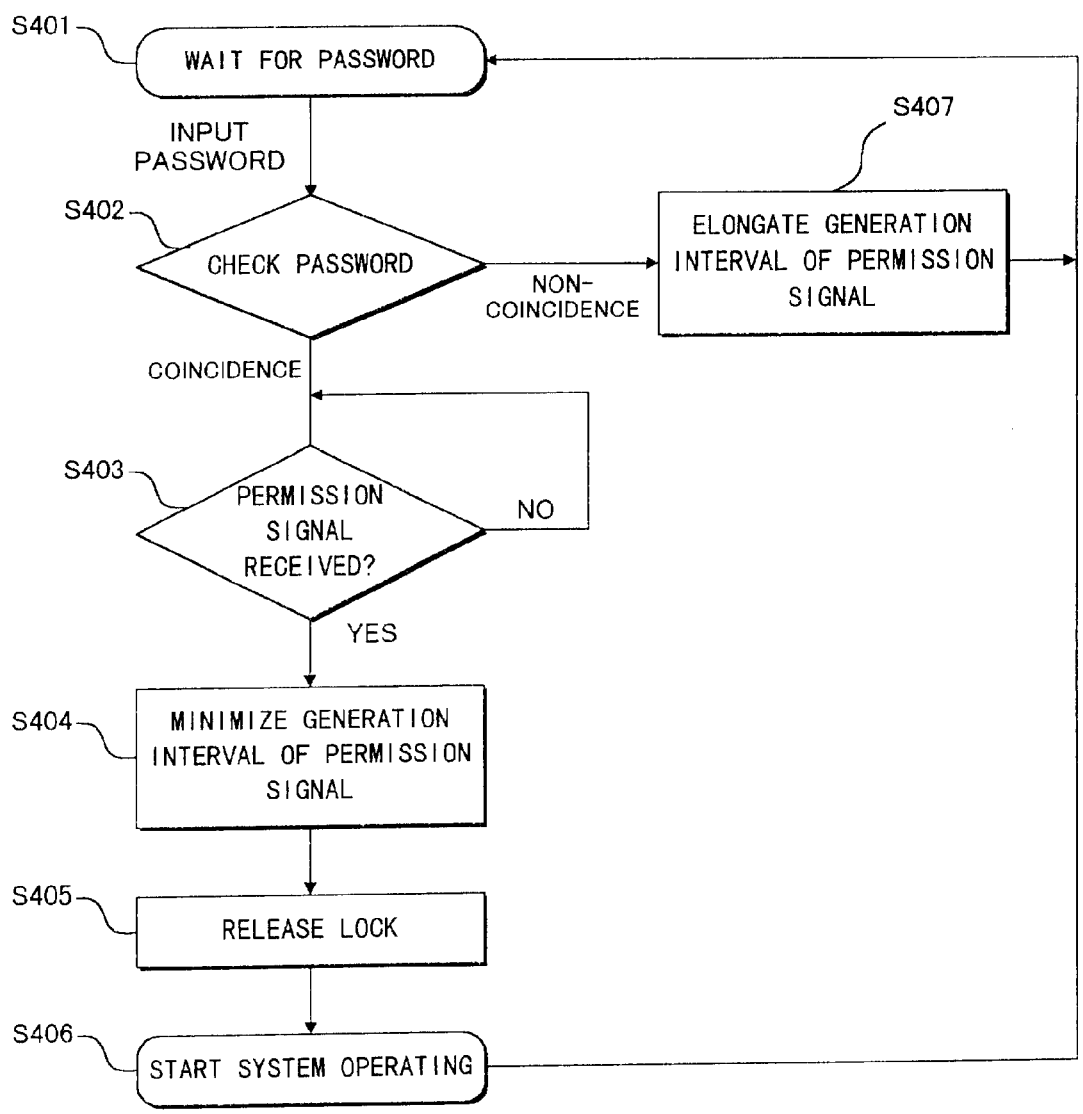
FIG. 6 is a flowchart showing an operation of the password information identification system of FIG. 5.

Referring to FIG. 6, the permission signal generator 307 generates permission signals $S_T$ as trigger signals for permitting the lock release operation. Normally, the permission signal generator 307 generates permission signals $S_T$ at minimum intervals. When a password $PW_{IN}$ is input through the input device 301 (step S401), the checking section 302 compares the input password $PW_{IN}$ with a registered password $PW_{REG}$ stored in advance in the memory 303 (step S402). If the comparison result is "coincidence," the lock release permitting section 304 waits for generation of a permission signal $S_T$ by the permission signal generator 307 (step S403). When a permission signal $S_T$ is received (YES at step S403), after the permission signal generation interval is reset to the minimum value (step S404), the lock release permitting section 304 outputs the lock release permission signal to the lock controller 305. The lock controller 305, in response to the lock release permission signal, operates to release the lock of the system 306 (step S405), thereby allowing it to operate (step S406).

On the other hand, if the input password $PW_{IN}$ is different from the registered password $PW_{REG}$, the checking section 302 detects non-coincidence (step S402). The consecutive-error counter 308 of the permission signal generator 307 counts errors in input passwords, and the generation interval controller 309 sets a permission signal generation interval in accordance with the count of the counter 308. The signal generator 310 generates the permission signal $S_T$ whose generation interval (cycle) is elongated in accordance with the set permission signal generation interval (step S407).

If a password $PW_{IN2}$ is input in this state and non-coincidence is detected, the error count is incremented by one and hence the permission signal generation interval is further elongated. On the other hand, even if coincidence is detected in this state, the lock release permitting section 304 does not immediately permit lock release because no permission signal is generated due to the elongated permission signal generation interval.

A user is not given any permission signal generation information. When he further inputs a password $PW_{IN3}$, the checking operation is performed, and a permission signal $S_T$ is then generated after a lapse of the permission signal generation interval. If a comparison result of the password $PW_{IN3}$ is "non-coincidence", control returns to the password input waiting state (step S401). If the comparison result is "coincidence," the permission signal generation interval is made the minimum value (step S404), the lock is released (step S405), and the system 306 is allowed to operate. The fact that as described above the lock is not released even if the input password $PW_{IN2}$ is a registered one and the comparison result is "coincidence" is the important feature of this system. If non-coincidence is again detected with an input password $PW_{IN3}$, the error count is incremented by one. As a result, the permission signal generation interval is further elongated, which means that the lock release prohibition time is elongated accordingly.

A consideration will be given to a case where a registered password is input once after N times of input of wrong passwords. In this case, permission signals $S_T$ are generated at permission signal generation intervals corresponding to the number N of errors. When a registered password $PW_{REG}$ is input, the checking section 302 detects coincidence and the lock release permitting section 304 detects a permission signal $S_T$ that is generated after a lapse of the permission signal generation interval that corresponds to the number N of errors and permits the lock release operation. Then, the permission signal generation interval is returned to the minimum value (step S404), the lock is released (step S405), and the system 306 is allowed to operate (step S406).

Figure 7:
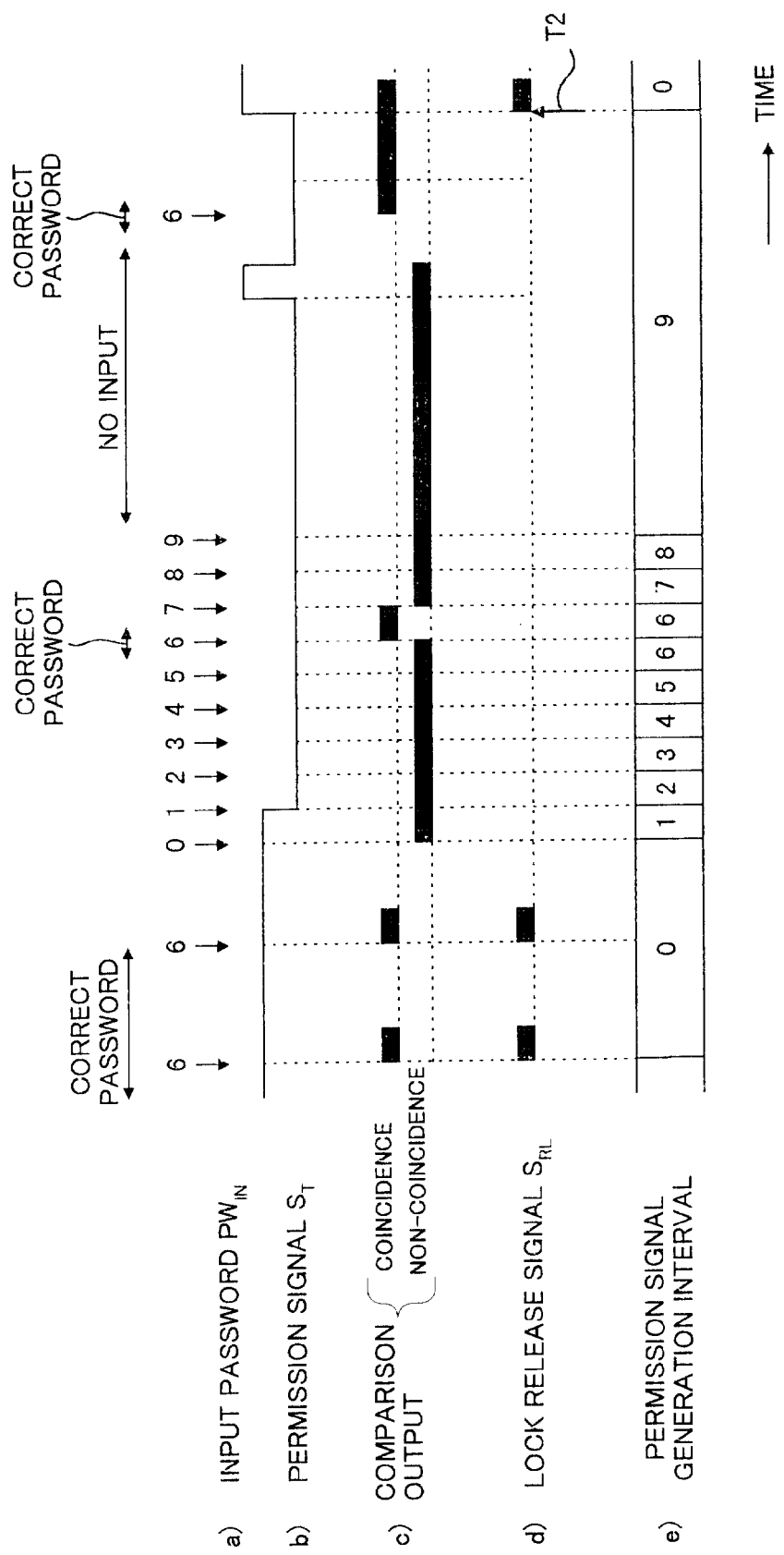
FIG. 7 is a time chart showing an example of the operation of the password information identification system of FIG. 5.
Figure 8:
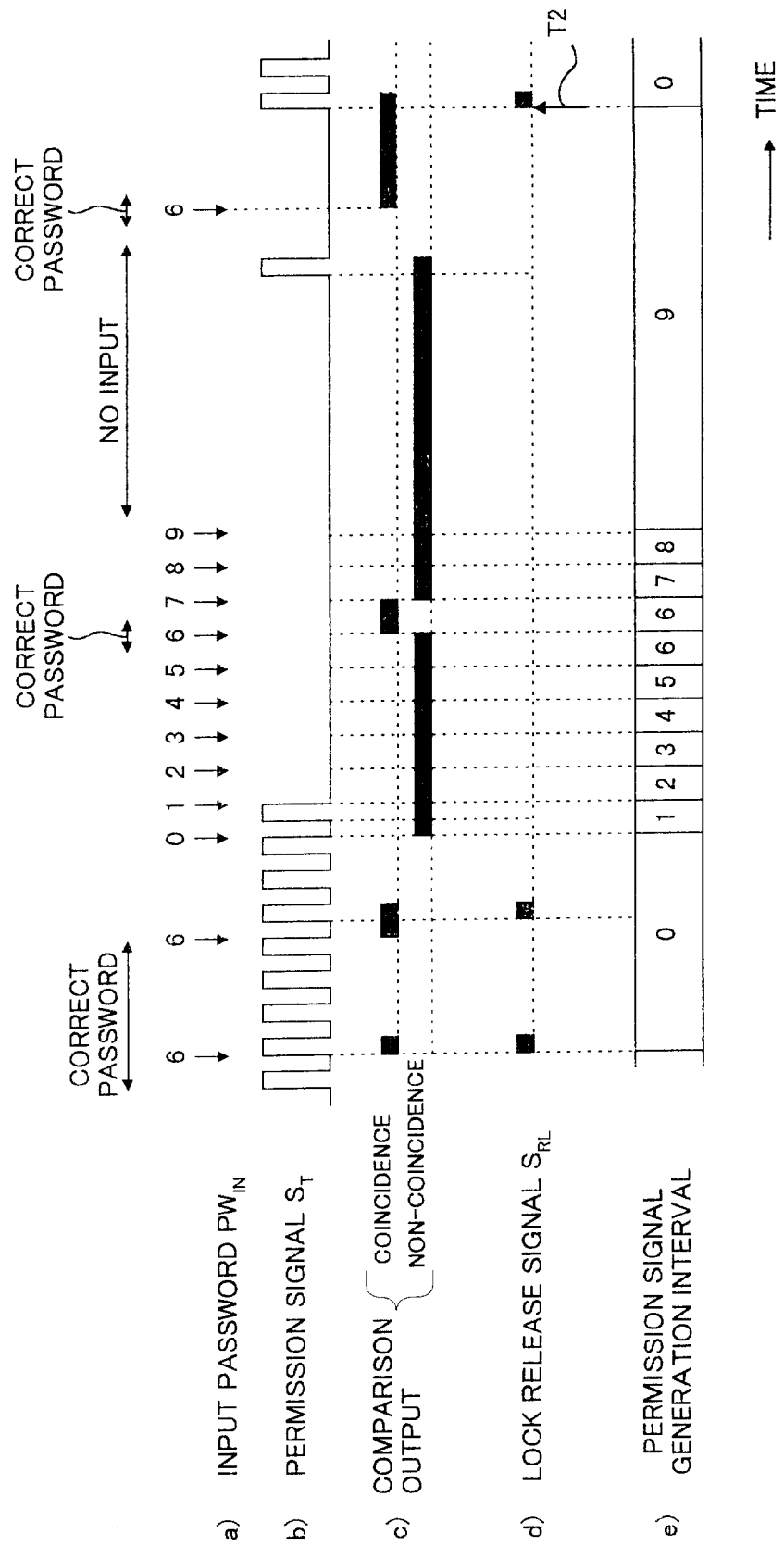
FIG. 8 is a time chart showing another example of the operation of the password information identification system of FIG. 5.

Next, the permission signal generation interval will be described with reference to time charts of FIGS. 7 and 8. Each of FIGS. 7 and 8 show input passwords $PW_{IN}$, permission signals $S_T$, comparison outputs indicating comparison results of the checking section 302, and lock release signals $S_{RL}$ which are output from the lock controller 305. In each of FIGS. 7 and 8, the horizontal axis represents time while solid segments of the comparison outputs and the lock release signals $S_{RL}$ represent active states and broken lines represent inactive states.

In the permission signals $S_T$ of FIG. 7(b), permission is indicated by a high level. The permission signals $S_T$ of FIG. 8(b) are used as triggers and operations are effected at the rising edges of the triggers. While no password is input, the checking operation is not performed. In this example, to simplify the description, it is assumed that the registered password $PW_{REG}$ is "6" and input of only passwords $PW_{IN}$ of "0" to "9" is accepted.

Referring to FIG. 7, in the normal state in which the permission signal generation interval is set to a minimum value ("0" in this example), the lock is released and the system 306 is allowed to operate as soon as the registered password $PW_{REG}$ of "6" is input.

A consideration will be given to a case where a user who intends to break the password inputs all passwords "0" to "9" on a try-everything basis. When a first password $PW_{IN}$ of "0" is input, the checking section 302 detects non-coincidence and the number of errors becomes 1. As a result, the permission signal generation interval, which was "0" in the initial state, becomes "1." When a next password $PW_{IN}$ of "1" is input, the checking section 302 detects non-coincidence and hence the number of errors becomes 2 and the permission signal generation interval becomes "2." Then, passwords $PW_{IN}$ of "3" to "5" are sequentially input, so that the number of errors becomes 6 and the permission signal generation interval becomes "6."

When a registered password $PW_{IN}$ of "6" is input subsequently, the checking section 302 detects coincidence. However, since no permission signal $S_T$ is generated, the lock release permitting section 304 does not permit lock release. Subsequently, passwords $PW_{IN}$ of "7" to "9" are sequentially input, so that the number of errors becomes 9 and the permission signal generation interval becomes "9." Thereafter, the checking section 302 does not operate while no password input is made. Therefore, neither coincidence nor non-coincidence is detected and the permission signal generation interval is kept at "9."

When a registered password $PW_{IN}$ of "6" is thereafter input, coincidence is detected but the lock is not released until generation of a permission signal $S_T$. When a permission signal $S_T$ is generated at time T2 after a lapse of a permission signal generation interval "9," the permission signal generation interval is made the minimum value, the lock is released, and the system 306 is allowed to operate.

Referring to FIG. 8, as in the case of the example of FIG. 7, in the normal state the permission signal generation interval is minimum and permission signals $S_T$ rise consecutively at minimum intervals. If a registered password $PW_{REG}$ of "6" is input in this state, the lock is released immediately and the system 306 is allowed to operate.

A consideration will be given to a case where a user who intends to break the password inputs all passwords "0" to "9" on a try-everything basis. In this case, as in the case of the example of FIG. 7, the permission signal generation interval is elongated as the number of events of non-coincidence in comparison results increases. After the number of errors becomes 9 and the permission signal generation interval becomes "9", the checking section 302 does not operate while no password input is made. Since neither coincidence nor non-coincidence is detected, the permission signal generation interval is kept at "9."

When a registered password $PW_{REG}$ of "6" is thereafter input, coincidence is detected but the lock is not released while no permission signal $S_T$ is generated. When a permission signal $S_T$ is generated at time T2 after a lapse of a permission signal generation interval "9", the permission signal generation interval is made the minimum value, the lock is released, and the system 306 is allowed to operate.

Figure 9:
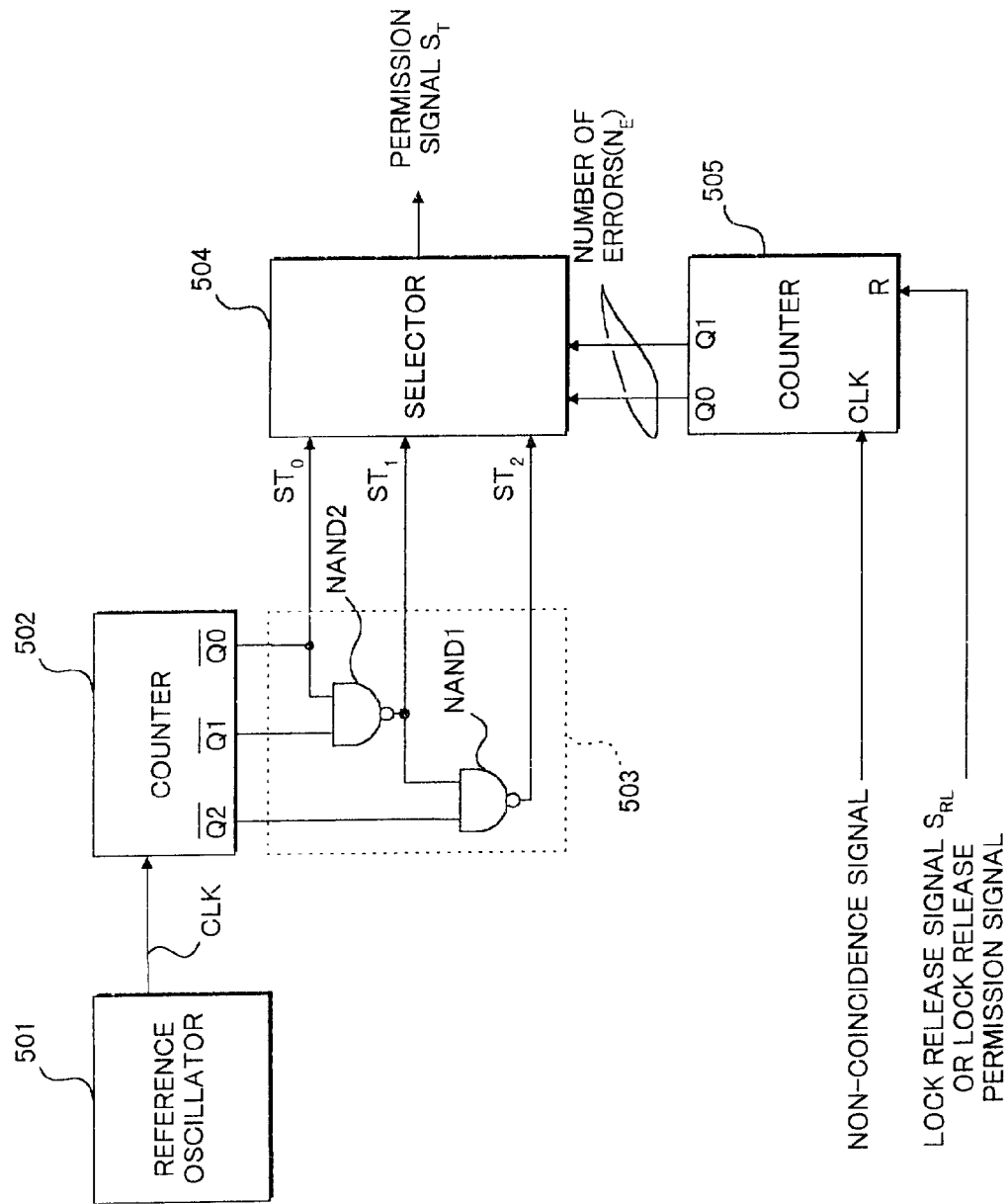
FIG. 9 is a detailed block diagram showing a first example of a permission signal generator of FIG. 1 or FIG. 5.

Referring to FIG. 9, the permission signal generator 107 or 307 may be constituted of the following components, for example. A reference oscillator 501 outputs a reference clock signal CLK to a counter 502. The counter 502 performs a counting operation in response to clock pulses of the reference clock signal CLK. A logic circuit 503 receives the outputs of the counter 502 and generates clock signals $S_{T0}$ to $S_{T2}$ of different cycles based on the count outputs of the counter 502. A counter 505 receives the non-coincidence signal from the checking section 103 or 302 and outputs the number $N_E$ of errors by counting the number of non-coincidence events. Further, the counter 505 receives the lock release signal $S_{RL}$ as a count reset signal from the lock controller 105 or 305. Alternatively, the lock release permission signal may be received from the lock release permitting section 304 in the embodiment as shown in FIG. 5. A selector 504 selects one of the clock signals $S_{T0}$ to $S_{T2}$ in accordance with the number $N_E$ of errors and outputs the selected one as a permission signal $S_T$ to the check permitting section 102 or the lock release permitting section 304.

The logic circuit 503 consists of a NAND gate NAND1 having inverted outputs $\overline{Q0}$ and $\overline{Q1}$ of the counter 502 as inputs and another NAND gate NAND2 having inverted outputs $\overline{Q1}$ and $\overline{Q2}$ of the counter 502 as inputs. The NAND gates NAND1 and NAND2 output the clock signals $S_{T1}$ and $S_{T2}$ to the selector 504. An inverted output $\overline{Q0}$ of the counter 502 is also supplied to the selector 504 as the clock signal $S_{T0}$.

The counter 502 and the logic circuit 503 generate a plurality of clock signals $S_{T0}$ to $S_{T2}$ having different periods from the reference clock CLK. The selector 504 selects one of the clock signals $S_{T0}$ to $S_{T2}$ according to the number NE of errors which is counted by the counter 505. The non-coincidence signal, which is one of two comparison results of the checking section 103 or 302, is supplied to the counter 505 as a clock signal. A signal for setting the permission signal generation interval at the minimum value, such as a lock releasing signal $S_{RL}$, is also supplied to the counter 505 as a reset signal. In this manner, the function of setting the permission signal generation interval at the minimum value when the comparison result is "coincidence" (step S204 in FIG. 2 or step S404 in FIG. 6) is realized.

Figure 10:
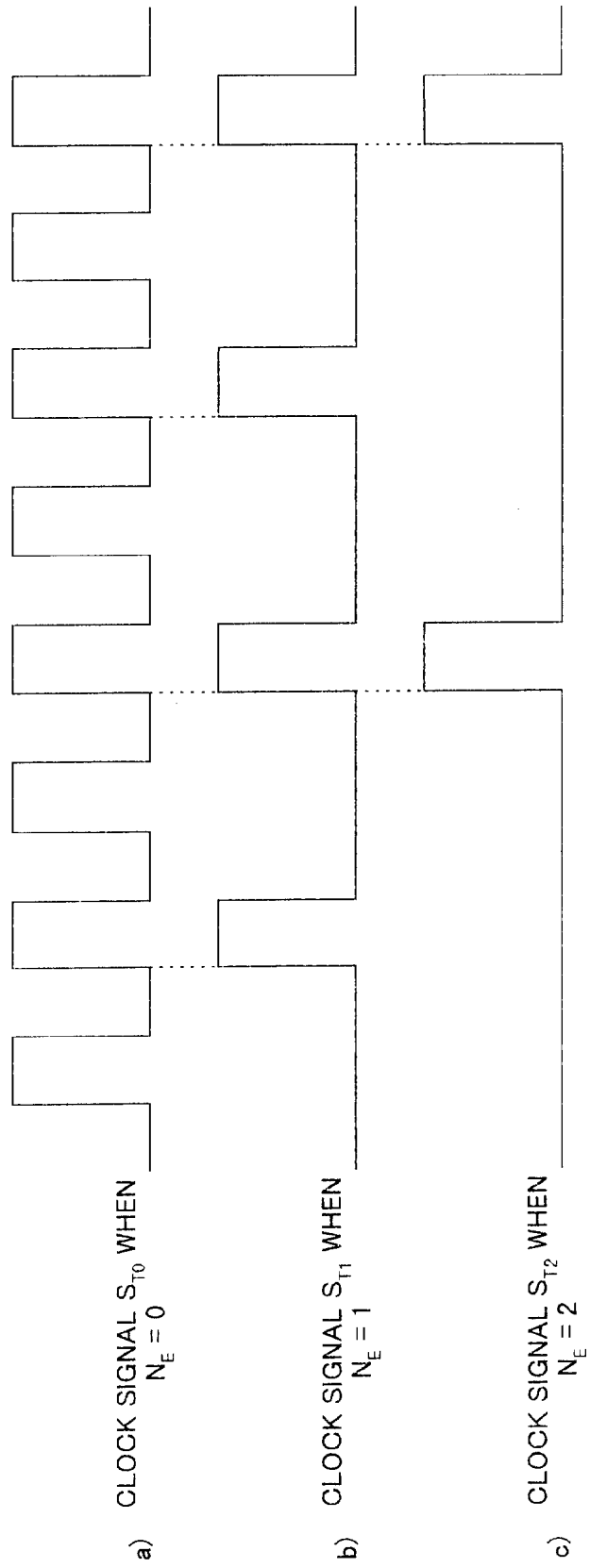
FIG. 10 is a time chart showing an operation of the permission signal generator of FIG. 9.

As shown in FIG. 10, in this example, the selector 504 receives three kinds of waveforms $S_{T0}$ to $S_{T2}$. When the number $N_E$ of errors is 0 (normal state), a timing clock signal $S_{T0}$ having a given cycle is selected as the permission signal $S_T$. When the number $N_E$ of errors is 1, a frequency-halved timing clock signal $S_{T1}$ is selected as the permission signal $S_T$. When the number $N_E$ of errors is 2, a frequency-quartered timing signal $S_{T2}$ is selected as the permission signal $S_T$. In short, the frequency or cycle of the permission signal $S_T$ is controlled in accordance with the number of events of non-coincidence in comparison results.

In this example, the maximum countable number of errors is 3 because the counter 505 is a 2-bit counter. The countable number of errors can be increased by increasing the number of bits of the counter 505 and the kinds of signals generated by the counter 502 and the logic circuit 503, i.e., the kinds of different frequencies. In general, N (N is an integer) frequency dividers having different divisors may be used to produce N clock signals $S_{T0}$-$S_{TN}$ having different frequencies. And a selector selects one from the N clock signals as the permission signal $S_T$. Further, the circuit configuration of FIG. 9 can easily be implemented by using a known DSP (digital signal processor), a CPU (central processing unit), or the like.

Figure 11:
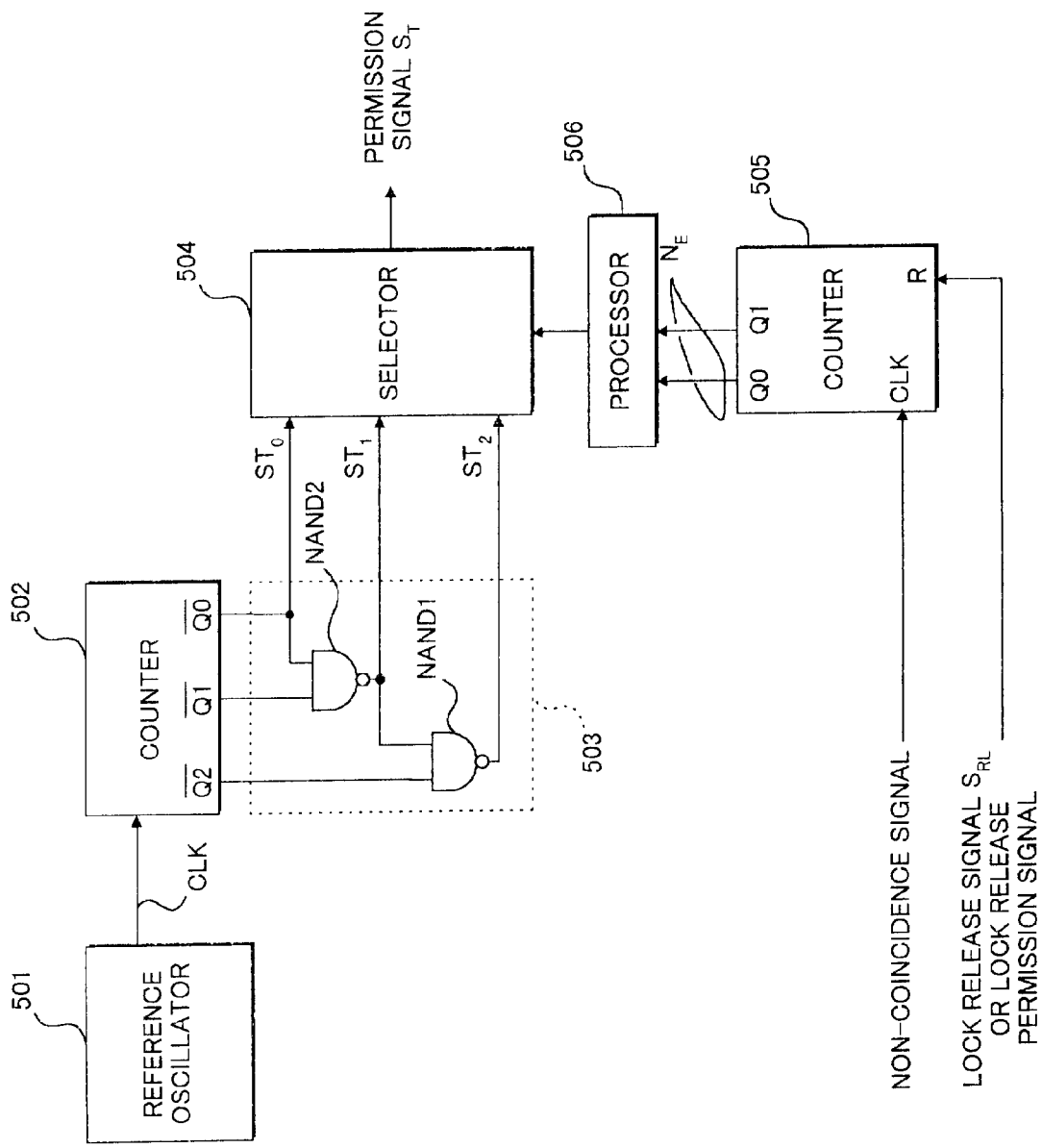
FIG. 11 is a detailed block diagram showing a second example of the permission signal generator of FIG. 1 or FIG. 5.

As shown in FIG. 11, where circuit blocks similar to those previously described with reference to FIG. 9 are denoted by the same reference numerals, a processor (or a logic circuit) 506 may be used to control the selector 504 based on the number $N_E$ of errors. For example, this configuration can accommodate a case where the number $N_E$ of errors exceeds an allowable range. Specifically, the checking operation may be suspended when the number $N_E$ of errors exceeds an allowable range, for instance, $0 \leq N_E \leq 8$.

It is possible to make a password harder to break by making the relationship between the number $N_E$ of errors and the permission signal generation interval more complex by means of the processor 506. Specifically, random numbers are generated by the processor 506 in accordance with the number $N_E$ of errors, to cause the selector 504 to select the cycles of the clock signals randomly. In this case, since the frequency of the permission signal $S_T$ is randomly varied in accordance with random numbers, it becomes more difficult to break the password.

Although in the above embodiments the password is assumed to be a single-digit number for convenience of description, it is apparent that the invention can be applied to a case where the password is a number of two or more digits. In the latter case, the embodiments may be adapted such that the entire input password is compared with the entire password that is stored in advance in the memory.

Furthermore, the check permitting section 102 as shown in FIG. 1 may be composed of delay flip-flop circuits which use the permission signal $S_T$ as a timing clock. The lock release permitting section 304 as shown in FIG. 5 may be composed of an AND gate inputting the permission signal $S_T$ and the comparison result. Needless to say, the configuration consisting of the check permitting section 102, the checking section 103, the lock controller 105 and the permission signal generator 107 may be implemented by a program-controlled processor (DSP or CPU). Similarly, the configuration consisting of the checking section 302, the lock release permitting section 304, the lock controller 305 and the permission signal generator 307 may be implemented by a program-controlled processor (DSP or CPU).

As described above, according to the present invention, the interval between checking operations or the interval between lock release permitting operations is elongated in accordance with the number of events of non-coincidence in password comparison results. Therefore, even if all possible passwords are input, coincidence does not occur. This provides an advantage that a password is not easily broken even with the use of a computer or the like. Further, according to the invention, the password input function is not locked. This provides another advantage that even after input of a wrong password, the lock of a system can still be released by inputting a registered password.

What is claimed is:

1. A system for providing authorization by checking whether input information is coincident with predetermined information, comprising:

a first controller for varying the length of the time periods between the generation of permission timing intervals based on a check result of the coincidence of the input information with the predetermined information; and a second controller for providing the authorization when the check result indicates coincidence during a permission timing interval, wherein during permission timing intervals a coincidence between the input information and the predetermined information results in providing authorization, and during the time periods between the permission timing intervals a coincidence between the input information and the predetermined information will not provide authorization.

2. The system according to claim 1, wherein the first controller elongates the length of the time periods between the permission timing intervals based on the check result of the input information.

3. The system according to claim 2, wherein the first controller elongates the length of the time periods between the permission timing intervals as the number of check results indicating non-coincidence increases.

4. The system according to claim 1, wherein the first controller randomly varies the length of the time periods between the permission timing intervals based on the check result of the input information.

5. The system according to claim 1, wherein the second controller comprises:

a check timing controller for controlling check timing of the input information according to the permission timing intervals; and a controller for providing the authorization when receiving the check result indicating coincidence.

6. The system according to claim 1, wherein the second controller comprises:

a timing controller for controlling timing of the authorization according to the permission timing intervals; and a controller for providing the authorization when receiving the check result indicating coincidence during a permission timing interval.

7. An identification system for providing authorization based on input information, comprising:

an information checker for comparing the input information with predetermined information to produce a comparison result indicating one of coincidence and non-coincidence;

a timing generator for generating permission signals with the length of the time periods between the permission signals being based on the comparison result; and a controller for providing the authorization based on both the permission signal and the comparison result, wherein during the time permission signals are present a coincidence between the input information and the predetermined information results in providing authorization, and during the time periods between the presence of permission signals a coincidence between the input information and the predetermined information will not provide authorization.

8. The identification system according to claim 7, wherein
the information checker produces the comparison result in response to the permission signal received from the timing generator and
the controller provides the authorization when receiving the comparison result indicating coincidence from the information checker.

9. The identification system according to claim 8, wherein the information checker comprises:
a check permitting gate for supplying the input information to the information checker in response to the permission signal received from the timing generator; and
a comparator for comparing the input information with the predetermined information to produce the comparison result.

10. The identification system according to claim 8, wherein the timing generator elongates the length of the time periods between the permission signals based on the check result of the input information.

11. The identification system according to claim 10, wherein the timing generator elongates the length of the time periods between the permission signals as the number of check results indicating non-coincidence increases.

12. The identification system according to claim 8, wherein the timing generator randomly varies the length of the time periods between the permission signals based on the check result of the input information.

13. The identification system according to claim 7, wherein the controller provides the authorization when receiving the permission signal received from the timing generator while the comparison result indicating coincidence.

14. The identification system according to claim 13, wherein the controller comprises:
a release permitting gate for transferring the comparison result received from the information checker in response to the permission signal received from the timing generator; and
a lock controller for providing authorization of lock release when receiving the comparison result indicating coincidence from the release permitting gate.

15. The identification system according to claim 13, wherein the timing generator elongates the generation interval of the permission signal based the comparison result of the input information.

16. The identification system according to claim 15, wherein the timing generator elongates the length of the time periods between the permission signals as the number of comparison results indicating non-coincidence increases.

17. The identification system according to claim 13, wherein the timing generator randomly varies the length of the time periods between the permission signals based on the comparison result of the input information.

18. The identification system according to claim 7, wherein the timing generator comprises:
a reference oscillator for generating a reference clock signal; and
a frequency controller for varying a frequency of the reference clock signal received from the reference oscillator to generate the permission signal based on the comparison result.

19. The identification system according to claim 18, wherein the frequency controller comprises:
a frequency divider for generating a plurality of clock signals from the reference clock signal, the clock signals having different frequencies;
a counter for counting comparison results indicating non-coincidence to produce a non-coincidence count; and
a selector for selecting one from the clock signals as the permission signal based on the non-coincidence count.

20. The identification system according to claim 19, wherein the selector selects a clock signal having a lower frequency as the non-coincidence count increases.

21. The identification system according to claim 19, wherein the selector randomly selects one from the clock signals as the permission signal based on the non-coincidence count.

22. A password identification system for controlling a lock release based on an input password, comprising:
an input device for inputting the input password;
a password checker for comparing the input password with a predetermined password to produce a comparison result indicating one of coincidence and non-coincidence;
a timing generator for generating permission signals with the length of the time periods between the permission signals being varied according to the number of comparison results indicating non-coincidence; and
a controller for providing the lock release based on both the permission signal and the comparison result, wherein during the time permission signals are present a coincidence between the input information and the predetermined information results in providing authorization, and during the time periods between the presence of permission signals a coincidence between the input information and the predetermined information will not provide authorization.

23. A method for providing authorization by checking whether input information is coincident with predetermined information, comprising the steps of:
a) varying the length of the time periods between the generation of permission timing intervals based on a check result of the coincidence of the input information with the predetermined information; and
b) providing the authorization when the check result indicates coincidence during a permission timing interval, wherein during permission timing intervals a coincidence between the input information and the predetermined information results in providing authorization, and during the time periods between the permission timing intervals a coincidence between the input information and the predetermined information will not provide authorization.

24. The method according to claim 23, wherein, in the step a), the length of the time periods between the permission timing intervals is elongated based on the check result of the input information.

25. The method according to claim 24, wherein the length of the time periods between the permission timing intervals is elongated as the number of check results indicating non-coincidence increases.

26. The method according to claim 23, wherein, in the step a) the length of the time periods between the permission timing intervals is randomly varied based on the check result of the input information.

27. The method according to claim 23, wherein the step b) comprises the steps of:
  controlling check timing of the input information according to the permission timing; and
  providing the authorization when receiving the check result indicating coincidence.

28. The method according to claim 23, wherein the step b) comprises the steps of:
  controlling timing of the authorization according to the permission timing; and
  providing the authorization when the check result indicates coincidence at the timing of the lock release.

29. A method for providing authorization based on input information, comprising:
  a) comparing the input information with predetermined information to produce a comparison result indicating one of coincidence and non-coincidence;
  b) generating a permission signal with the length of the time periods between the permission signals being based on the comparison result of the input information with the predetermined information; and
  c) providing the authorization based on both the permission signal and the comparison result, wherein during the time permission signals are present a coincidence between the input information and the predetermined information results in providing authorization, and during the time periods between the presence of permission signals a coincidence between the input information and the predetermined information will not provide authorization.

30. The method according to claim 29, wherein the step a) is performed in response to the permission signal received from the timing generator and the step c) is performed when the comparison result indicating coincidence is produced.

31. The method according to claim 30, wherein, in the step b) the length of the time periods between the permission signals is elongated as the number of comparison results indicating non-coincidence increases.

32. The method according to claim 30, wherein, in the step b) the length of the time periods between the permission signals is randomly varied.

33. The method according to claim 29, wherein the step c) is performed in response to the permission signal received from the timing while the comparison result indicating coincidence.

* * * * *